(12) United States Patent
Labry (10) Patent No.: US 12,404,008 B2
(45) Date of Patent: Sep. 2, 2025

(54) CONTROL MECHANISM

(71) Applicant: RATIER-FIGEAC SAS, Figeac (FR)

(72) Inventor: Pierre-Jacques Labry, Faycelles (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 18/748,170

(22) Filed: Jun. 20, 2024

(65) Prior Publication Data

US 2025/0121930 A1    Apr. 17, 2025

(30) Foreign Application Priority Data

Jun. 26, 2023  (EP) .................................... 23306019
Mar. 20, 2024  (EP) .................................... 24305416

(51) Int. Cl.
*B64C 13/34* (2006.01)

(52) U.S. Cl.
CPC .................................... *B64C 13/34* (2013.01)

(58) Field of Classification Search
CPC ....... B64C 13/34; B64C 13/044; B64C 13/06; B64C 13/042; B64C 13/22; B64C 13/50
See application file for complete search history.

(56) References Cited

U.S. PATENT DOCUMENTS

| | | | | |
|---|---|---|---|---|
| 2,478,546 A | * | 8/1949 | Pickens ................. | B64C 13/044 244/235 |
| 4,470,570 A | * | 9/1984 | Sakurai ................... | B64C 13/06 244/236 |
| 4,848,708 A | * | 7/1989 | Farrell ................... | B64C 13/044 244/235 |
| 10,196,130 B2 | | 2/2019 | Gemmati et al. | |
| 10,377,468 B2 | * | 8/2019 | Carner .................... | B64C 13/12 |
| 2017/0174324 A1 | * | 6/2017 | Carner .................... | B64C 13/12 |
| 2017/0253317 A1 | * | 9/2017 | Elliott ..................... | G05G 1/44 |
| 2017/0369154 A1 | * | 12/2017 | Zimmer .................. | G05G 1/40 |
| 2019/0315452 A1 | * | 10/2019 | Labry ..................... | F16H 51/00 |
| 2021/0129975 A1 | * | 5/2021 | Voiles .................... | B64C 13/50 |

OTHER PUBLICATIONS

European Search Report for Application No. 23306019.3, mailed Dec. 8, 2023, 6 pages.
European Search Report for Application No. 24305416.0, mailed Aug. 13, 2024, 6 pages.

* cited by examiner

*Primary Examiner* — Justin M Benedik
(74) *Attorney, Agent, or Firm* — CANTOR COLBURN LLP (57) ABSTRACT

A control mechanism for an aircraft includes: a conversion mechanism having a translatable part and a rotatable part, the translatable part being reversibly translatable and being connectable to an inceptor; an inceptor connector connected to the translatable part of the conversion mechanism; a differential device connected to the rotatable part of the conversion mechanism, the conversion mechanism being configured to reversibly convert translational motion of the inceptor connector to rotational motion of the differential device; an adjustment member connected to the differential device; and a control member connected to the differential device; wherein the differential device is configured such that the adjustment member is maintainable in position during an aircraft control process to permit: translation of the inceptor connector from a translational neutral position; and corresponding movement of the control member, to control the aircraft through the differential device.

16 Claims, 9 Drawing Sheets

CONTROL MECHANISM

CROSS-REFERENCE TO RELATED APPLICATIONS

This application claims the benefit of European Patent Application No. 23306019.3 filed Jun. 26, 2023 and European Patent Application No. 24305416.0 filed Mar. 20, 2024, the disclosures of which are incorporated herein by reference in their entirety.

TECHNICAL FIELD

This disclosure relates to a control mechanism for an aircraft.

BACKGROUND

Control mechanisms in aircraft allow adjustment processes to be performed in which an inceptor neutral position and/or morphology of the control mechanism is adapted for a pilot's stature. These mechanisms also allow aircraft control processes to be carried out, for example, rudder control.

It is desirable to have the inceptor trajectory be as close as possible to linear. Current control mechanisms typically feature long arms in order to limit curving of the inception motion, but a compromise is necessary to limit the size and weight of the control mechanisms. It is therefore desirable to improve control mechanisms, as well as reduce the space they occupy in the aircraft and reduce their weight.

SUMMARY

According to a first aspect, there is provided a control mechanism for an aircraft, the control mechanism comprising: a conversion mechanism having a translatable part and a rotatable part, the translatable part being reversibly translatable; an inceptor connector connected to the translatable part of the conversion mechanism; a differential device connected to the rotatable part of the conversion mechanism, the conversion mechanism being configured to reversibly convert translational motion of the inceptor connector to rotational motion of the differential device; an adjustment member connected to the differential device; and a control member connected to the differential device; wherein the differential device is configured such that the adjustment member is maintainable in position during an aircraft control process to permit: translation of the inceptor connector from a translational neutral position; and corresponding movement of the control member, to control the aircraft through the differential device; and wherein the differential device is configured such that the control member is maintainable in position during an adjustment process to permit: translation of the inceptor connector; and corresponding movement of the adjustment member through the differential device, to adjust the translational neutral position. By providing a differential device as described above, the motion of the control member is disconnected from the motion of the adjustment member, and vice versa. This arrangement is more compact and means that the adjustment process does not affect the feel force for the aircraft control process. Additionally, the provision of a reversible translation to rotation conversion mechanism allows the control mechanism to be provided as hand-operated if desired.

The control mechanism may comprise an adjustment member maintaining device. The adjustment member maintaining device may be configured to, during the aircraft control process, resist movement of the adjustment member.

The adjustment member maintaining device may be configured to, during the adjustment process, provide discrete positions of the inceptor connector along the conversion mechanism to allow variation of the translational neutral position. More specifically, the adjustment member maintaining device may be configured to, during the adjustment process, provide discrete positions of the inceptor connector and the translatable part of the conversion mechanism along the rotatable part of the conversion mechanism to allow variation of the translational neutral position.

The adjustment member maintaining device may comprise a plurality of notches. Each of the plurality of notches may be configured to, during the adjustment process, provide discrete positioning of the inceptor connector along the conversion mechanism. More specifically, each of the plurality of notches may be configured to, during the adjustment process, provide discrete positioning of the inceptor connector and the translatable part of the conversion mechanism along the rotatable part of the conversion mechanism.

The adjustment member maintaining device may comprise a disc. The disc may comprise a plurality of notches around a circumference of the disc. The disc may be coupled to the adjustment member.

The adjustment member maintaining device may comprise a locking member. The locking member may be configured, during a control process, to engage one of the plurality of notches.

The adjustment member maintaining device may comprise an elastic member. The elastic member may be configured to bias the locking member to, during a control process, engage one of the plurality of notches.

Alternatively, the adjustment member maintaining device may comprise a non-reversible device. The non-reversible device may be configured to, during the adjustment process, provide continuous positioning of the inceptor connector along the conversion mechanism. More specifically, the non-reversible device may be configured to, during the adjustment process, provide continuous positioning of the inceptor connector and the translatable part of the conversion mechanism along the rotatable part of the conversion mechanism.

The non-reversible device may be manually or electrically actuatable.

The control mechanism may comprise an elastic element configured to bring the translation neutral position of the inceptor connector back toward a pilot.

The control mechanism may comprise a control member maintaining device configured to, during the adjustment process, resist movement of the control member.

The control member maintaining device may be a control member locking device configured to, during the adjustment process, lock movement of the control member.

The control member may be rotatable during the aircraft control process. For example, the control member may be rotatable, during the aircraft movement control process, to allow translation of the inceptor connector from the translational neutral position to a control position. Additionally, the control member may be rotatable, during the aircraft movement control process, to allow translation of the inceptor connector from the control position to the translational neutral position.

The control member maintaining device may comprise a control member biasing device configured to, during the aircraft control process, bias the inceptor connector towards the translational neutral position.

The biasing device may comprise a feeling unit. The feeling unit may comprise a centering spring.

The control mechanism may comprise a motor configured to rotate the control member during the aircraft movement control process.

The adjustment member may be rotatable during the adjustment process. For example, the adjustment member may be rotatable, during the adjustment process, to allow translation of the inceptor connector along the conversion mechanism to allow variation of the translational neutral position of the inceptor connector. More specifically, the adjustment member may be rotatable, during the adjustment process, to allow translation of the inceptor connector and the translatable part of the conversion mechanism along the rotatable part of the conversion mechanism to allow variation of the translational neutral position of the inceptor connector.

The control mechanism may comprise a motor configured to rotate the adjustment member during the adjustment process.

The differential device may comprise an epicyclic gear train.

The epicyclic gear train may comprise a sun gear, wherein the rotatable part of the conversion mechanism is coupled to the sun gear such that the rotatable part of the conversion mechanism rotates with the sun gear.

The epicyclic gear train may comprise a carrier, wherein the control member is coupled to the carrier such that the carrier rotates with the control member during the aircraft control process.

The epicyclic gear train may comprise a ring gear, wherein the adjustment member is coupled to the ring gear, such that the ring gear rotates with the adjustment member during the adjustment process.

The differential device may comprise a harmonic drive, a conical gear differential, or a spur gear differential.

The differential device may comprise a first planetary gear, wherein the rotatable part of the conversion mechanism is coupled to the first planetary gear such that the rotatable part of the conversion mechanism rotates with the first planetary gear.

The differential device may comprise a satellite gear, wherein the first planetary gear is coupled to the satellite gear such that the first planetary gear rotates with the satellite gear.

The differential device may comprise a second planetary gear, wherein the satellite gear is coupled to the second planetary gear such that the second planetary gear rotates with the satellite gear.

The differential device may be configured such that during the aircraft control process, the adjustment member prevents rotation of the satellite gear to cause the satellite gear to be rigidly connected to the first and second planetary gears. The differential device may be configured such that during the aircraft control process, the first and second planetary gears rotate together.

The differential device may be configured such that during the adjustment process, the satellite gear is permitted to rotate to permit opposing rotation of the first and second planetary gears.

The first planetary gear and/or second planetary gear may comprise a compound gear.

The rotatable part of the conversion mechanism may comprise a gear.

The conversion mechanism may be configured to be inclined relative to a horizontal axis when installed. The conversion mechanism may be configured to be inclined relative to a longitudinal axis of an aircraft when installed on the aircraft.

The translatable part of the conversion mechanism may be a nut. The rotatable part of the translation mechanism may be a screw. The nut may be configured to reversibly translate along the screw upon rotation of the screw. The differential device may be actuatable to reversibly rotate the screw upon translation of the inceptor connector.

Alternatively, the rotatable part of the conversion mechanism may be a nut. The translatable part of the conversion mechanism may be a screw.

The inceptor connector may be integral with the translatable part of the conversion mechanism. The inceptor may be integral with the inceptor connector. Thus, both the inceptor connector and the inceptor may be integral with the translatable part of the conversion mechanism. However, for maintenance convenience, it is preferred that the inceptor connector, the inceptor and the translatable part of the conversion mechanism are distinct parts.

The control mechanism may comprise a guiding mechanism. The guiding mechanism may be configured to maintain an orientation of the inceptor connector during translation of the inceptor connector. The guiding mechanism may be configured to prevent rotation of the inceptor connector around a longitudinal axis of the conversion mechanism during translation of the inceptor connector.

The inceptor connector may be coupled to the guiding mechanism.

The guiding mechanism may comprise a rail, the inceptor connector being slidably coupled to the rail.

The guiding mechanism may comprise a first arm and a second arm, the first arm being pivotally coupled to the inceptor connector and the second arm, and the second arm being pivotally coupled to a fixed point.

The guiding mechanism may comprise a clasp, the inceptor connector being coupled to the clasp, and the clasp being connectable to a clasp of an additional inceptor connector.

The guiding mechanism may comprise a hinge device. The hinge device may comprise an arm connectable to an arm of an additional inceptor connector, the arm being coupled to the inceptor connector.

The control mechanism may comprise one or more sensors configured to detect rotation of the control member during the aircraft control process. The one or more sensors may be configured to output a signal in response to detecting the rotation of the control member. The signal may be a rudder control signal.

The signal may comprise an image of a rotational position of the control member during the aircraft control process.

The one or more sensors may be connected to the control member.

The control mechanism may comprise a stop to prevent movement of the control member when the inceptor connector reaches a maximum translation distance during the aircraft control process.

The control mechanism may be a rudder control mechanism.

The inceptor may be a pedal.

According to a second aspect, there is provided a bilateral control mechanism comprising: a further conversion mechanism having a translatable part and a rotatable part, the translatable part being reversibly translatable; and a further inceptor connector connected to the translatable part of the further conversion mechanism.

The differential device may be connected to the rotatable part of the further conversion mechanism. The further conversion mechanism may be configured to convert rotational motion of the differential device to translational motion of the further inceptor connector.

The second planetary gear may be coupled to the rotatable part of the further conversion mechanism such that the rotatable part of the further conversion mechanism rotates with the second planetary gear.

According to a third aspect, there is provided a bilateral control mechanism comprising: a first control mechanism as described above; and a second control mechanism as described above.

The differential device of the first control mechanism may be configured to engage with the differential device of the second control mechanism. The differential device of the first control mechanism may be indirectly engaged with the differential device of the second control mechanism. The differential device of the first control mechanism may be directly engaged with the differential device of the second control mechanism.

The differential device of the first control mechanism and the differential device of the second control mechanism may be synchronised such that on translation of the inceptor connector of the first control mechanism during the aircraft control process the inceptor connector of the second control mechanism translates in an opposing direction to the inceptor connector of the first control mechanism.

The differential device of the first control mechanism and the differential device of the second control mechanism may be synchronised such that on translation of the inceptor connector of the first control mechanism during the adjustment process the inceptor connector of the second control mechanism translates in the same direction as the inceptor connector of the first control mechanism.

The bilateral control mechanism may comprise only one control member and one adjustment member. The control member of the first control mechanism and the control member of the second control mechanism may be the same control member. The adjustment member of the first control mechanism and the adjustment member of the second control mechanism may the same adjustment member.

The bilateral control mechanism may comprise only one differential device. The differential device of the first control mechanism and the differential device of the second control mechanism may be the same differential device According to a fourth aspect, there is provided a control mechanism for an aircraft, the control mechanism comprising: an inceptor connector connectable to an inceptor; a linear conversion mechanism having a translatable part and a rotatable part, the inceptor connector being reversibly translatable with the translatable part of the linear conversion mechanism on the rotatable part of the linear conversion mechanism from a translational neutral position. By providing a linear conversion mechanism as described above, the motion of the inceptor connector is made linear. This arrangement is more ergonomic for a pilot and means that the control mechanism can be provided with long strokes, without requiring a large control mechanism. Additionally, pilots of different statures using this arrangement can experience the same feel force regardless of their stature.

The control mechanism may comprise any of the features described above.

According to a fifth aspect, there is provided an aircraft comprising a control mechanism as described above or a bilateral control mechanism as described above.

BRIEF DESCRIPTION OF THE FIGURES

Embodiments will be further described and explained by way of example with reference to the accompanying drawings in which.

DETAILED DESCRIPTION

Figure 1A:
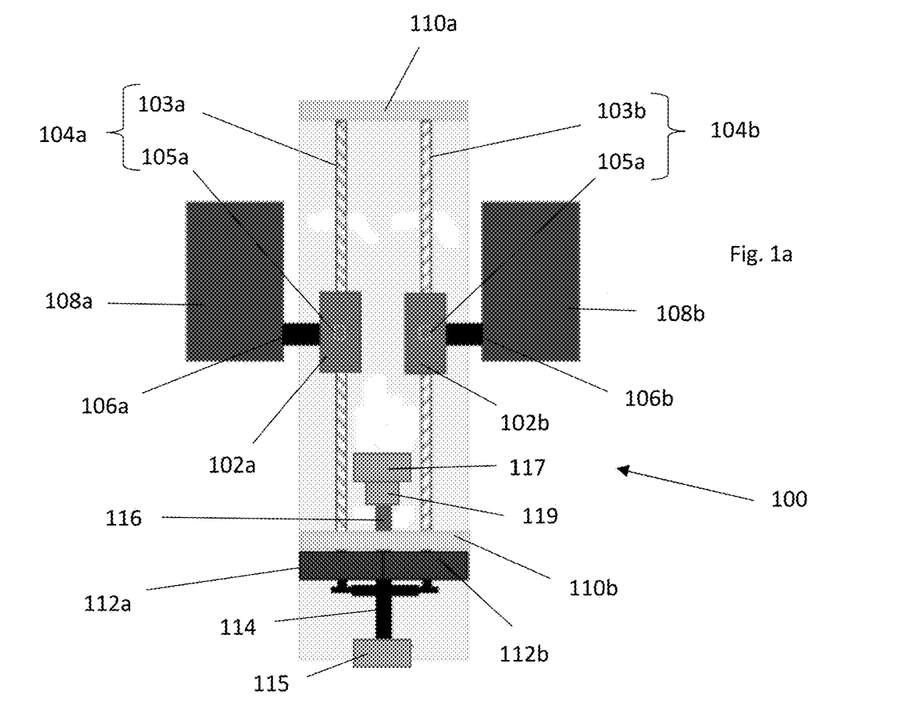
FIG. 1a shows a schematic of a bilateral control mechanism.
Figure 1B:
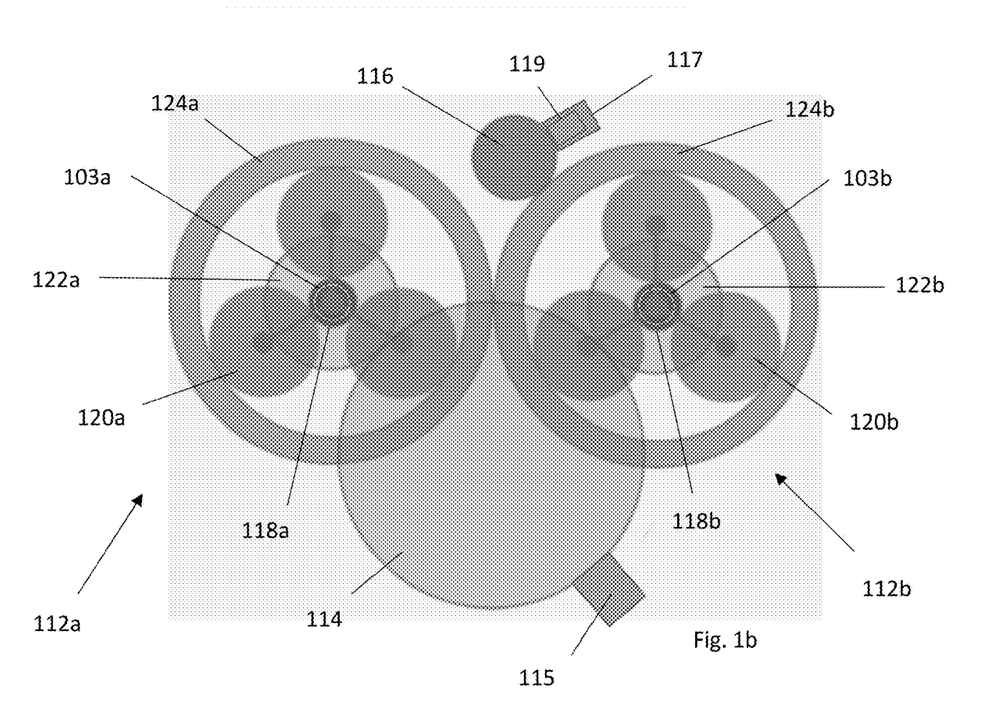
FIG. 1b shows a schematic of a section of a bilateral control mechanism.

With reference to FIGS. 1a-1b, a bilateral control mechanism 100 comprises a left control mechanism. The left control mechanism comprises a left inceptor connector 102a, a left conversion mechanism 104a, and a left differential device 112a. A left axle 106a is coupled to the left inceptor connector 102a and a left inceptor 108a (e.g. a left pedal) is rotationally coupled to the left axle 106a.

The left conversion mechanism 104a comprises a translatable part and a rotatable part. In this embodiment, the translatable part is a nut 105a and the rotatable part is a threaded shaft 103a (e.g. a ball screw or a roller screw) having a first end and a second, opposite end. The first end is rotationally coupled to a first plate 110a. The second end passes through a second plate 110b and is coupled to the left differential device 112a. The first plate 110a and the second plate 110b provide structural support to the left conversion mechanism 104a. The first plate 110a and the second plate 110b are fixed to a fixed point on the aircraft (e.g. an aircraft floor). The inceptor connector 102a is connected to the nut 105a and the nut 105a is moveably engaged with the threaded shaft 103a.

As illustrated in FIG. 1a, the bilateral control mechanism 100 further comprises a right control mechanism. The right control mechanism comprises a right inceptor connector 102b, a right conversion mechanism 104b, a right axle 106b, a right inceptor 108b (e.g. a right pedal), and a right differential device 112b. These components are positioned symmetrically along an axis of the bilateral control mechanism 100 with respect to the left control mechanism, and operate in the same manner as the left inceptor connector 102a, left conversion mechanism 104, left axle 106a, left inceptor 108a, and left differential device 112a. Repeated description of the additional components is omitted.

The left differential device 112a is coupled to a control member 114. The right differential device 112b is coupled to the control member 114. The right differential device 112b is coupled to an adjustment member 116. The left differential device 112a is coupled to the adjustment member 116 via the right differential device 112b. The control member 114 and adjustment member 116 each comprise a rigid rod. This arrangement allows the differential devices 112a, 112b to be synchronised (e.g. configured such that movement of one differential device causes movement of the other differential device, as described below). However, in other arrangements, the differential devices 112a, 112b may be synchronised using one or more gearsets.

The adjustment member 116 is connected to an adjustment member maintaining device 117 that resists movement of the adjustment member 116 during an aircraft control process. As will be described later, the use of an adjustment member maintaining device 117 prevents a simultaneous aircraft control process and adjustment process from occurring.

The adjustment member maintaining device 117 may be a reversible locking mechanism comprising a plurality of notches that engage complementary features (not shown) of the adjustment member 116 to provide discrete positions in order to lock the inceptor connectors 102a, 102b at different translational neutral positions along the threaded shafts of the conversion mechanisms 104a, 104b as required. In these embodiments, the bilateral control mechanism 100 may comprise an elastic element, such as a mechanical spring 119 that brings the translational neutral position of the inceptor connectors 102a, 102b back toward a pilot during an adjustment process. The mechanical spring 119 may be a torsion spring.

Alternatively, the adjustment member 116 may be connected to a non-reversible device that provides continuous positioning of the inceptor connectors 102a, 102b along the threaded shafts 103a, 103b of the conversion mechanisms 104a, 104b. The non-reversible device may be actuated manually, e.g. by a pilot, or may be actuated electrically, e.g. by a motor. The term "non-reversible" here means that the device is configured, when actuated by a motor, to prevent back driving of the motor.

In a similar manner, the control member 114 is connected to a control member maintaining device 115 that resists movement of the control member 114 during an adjustment process. As will be described later, the use of a control member maintaining device 115 prevents a simultaneous aircraft control process and adjustment process from occurring.

In some embodiments, the control member maintaining device 115 may be a control member locking device that locks the control member 114 in position. Alternatively, the control member maintaining device 115 may comprise a control member biasing device, such as a feeling unit, that prevents and/or reverses any movement of the control member 114 by biasing the inceptor connector 102a towards a translation neutral position.

Although not illustrated, in some embodiments, the bilateral control mechanism 100 may comprise two control members and two adjustment members.

The threaded shafts 103a, 103b of the conversion mechanisms 104a, 104b are threaded in opposite directions. Alternatively, the threaded shafts 103a, 103b of the conversion mechanisms 104a, 104b may be threaded in the same direction. However, in such arrangements, the coupling of the control member 114 and adjustment member 116, as described above, is reversed.

As illustrated in FIG. 1b, the left differential device 112a comprises a left epicyclic gear train and the right differential device 112b comprises a right epicyclic gear train. In other arrangements (not shown), the differential devices 112a, 112b may be replaced by a harmonic drive, a conical gear differential, or a spur gear differential.

Each epicyclic gear train comprises a sun gear 118a, 118b, a plurality of planetary gears 120a, 120b, a carrier 122a, 122b, and a ring gear 124a, 124b. The outer circumferential edge of each sun gear 118a, 118b engages (e.g. meshes) with the outer circumferential edge of each of the plurality of planetary gears 120a, 120b. The centre of each of the planetary gears 120a, 120b is rotationally coupled to the respective carrier 122a, 122b and the outer circumferential edge of each of the plurality of planetary gears 120a, 120b engages (e.g. meshes) with the inner circumferential edge of the respective ring gear 124a, 124b. This results in the left epicyclic gear train 112a having a left sun gear 118a, a plurality of left planetary gears 120a, a left carrier 122a and a left ring gear 124a. Similarly, the right epicyclic gear train 112b has a right sun gear 118b, a plurality of right planetary gears 120b, a right carrier 122b and a right ring gear 124b.

The threaded shafts 103a, 103b of the conversion mechanisms 104a, 104b are rigidly coupled to the sun gears 118a, 118b, with a threaded shaft 103a of the left conversion mechanism 104a connected to the left sun gear 118a and a threaded shaft 103b of the right mechanism 104b connected to the right sun gear 118b. The outer circumferential edge of the left carrier 122a and the outer circumferential edge of the right carrier 122b each engage (e.g. mesh) with the control member 114. The outer circumferential edge of the left ring gear 124a engages (e.g. meshes) with the outer circumferential edge of the right ring gear 124b. The adjustment member 116 engages (e.g. meshes) with the outer circumferential edge of the right ring gear 124b. In alternative arrangements, as described above, the coupling of the control member 114 and adjustment member 116 may be reversed and/or the adjustment member 116 or control member 114 may be rotationally coupled to the outer circumferential edge of the left ring gear 124a.

The terms "engage", "connect" and "couple" as used herein means that components may be directly or indirectly engaged, coupled or connected. In embodiments in which components are indirectly engaged, coupled or connected, intermediate components may be present.

Figure 2A:
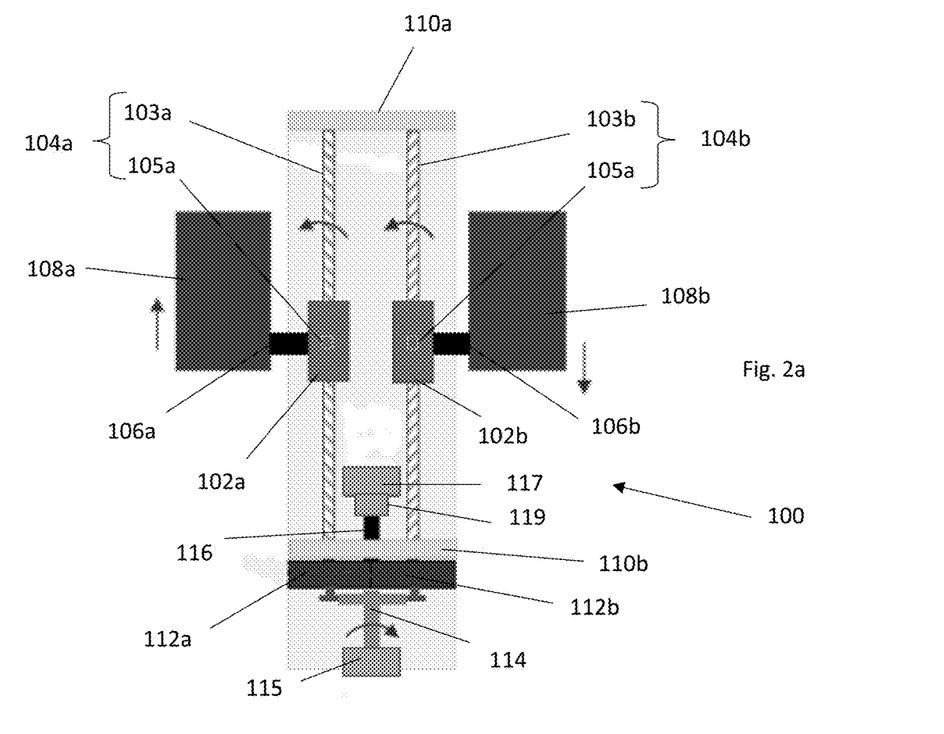
FIG. 2a shows a schematic of a bilateral control mechanism during an aircraft control process.
Figure 2B:
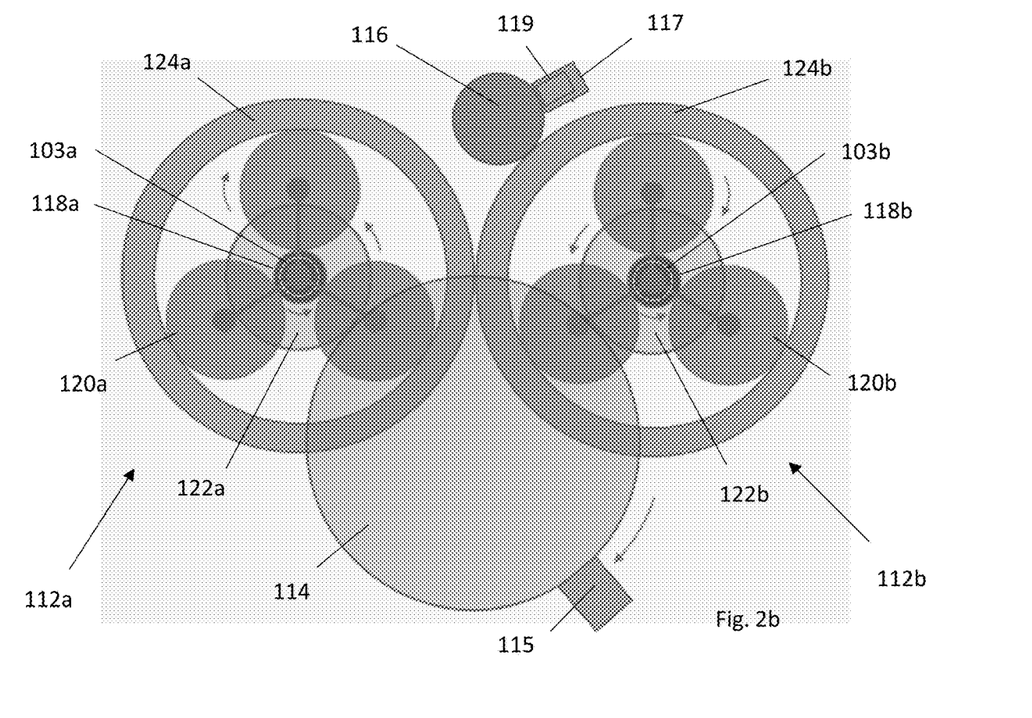
FIG. 2b shows a schematic of a section of a bilateral control mechanism during an aircraft control process.

With reference to FIGS. 2a-2b, when the left inceptor 108a is actuated during an aircraft control process, e.g. by a pilot, the left inceptor connector 102a translates along the threaded shaft 103a of the left conversion mechanism 104a from a translational neutral position e.g. in the direction indicated (i.e. towards the first plate 110a). Since the left inceptor connector 102a is connected to a nut 105a, through which the threaded shaft 103a of the left conversion mechanism 104a extends, translation of the left inceptor connector 102a relative to the left conversion mechanism 104a causes the threaded shaft 103a of the left conversion mechanism 104a to rotate about an axis of the threaded shaft 103a in an anti-clockwise direction as indicated in FIG. 2a (i.e. anti-clockwise from the perspective of the pilot looking towards the first plate 110a). This in turn causes the left differential device 112a to rotate with the threaded shaft 103a of the left conversion mechanism 104a. Specifically, the left sun gear 118a rotates about an axis of the left differential device 112a in the same rotational direction as the threaded shaft 103a of the left conversion mechanism 104a (i.e. anti-clockwise). Because the left sun gear 118a engages (e.g. meshes) with the plurality of planetary gears 120a, each of the plurality of left planetary gears 120a also rotates, but in the opposite direction (i.e. clockwise) about an axis of each respective planetary gear 120a.

As described later, the left ring gear 124a is maintained in position during an aircraft control process. This means that the rotation of each of the plurality of planetary gears 120a causes them to orbit the left sun gear 118a along the inner circumferential edge of the left ring gear 124a in the same direction as the sun gear 118a (i.e. anti-clockwise). Because the plurality of planetary gears 120a are coupled to the left carrier 122a, the left carrier 122a rotates with the orbit of the plurality of left planetary gears 120a, while the control member 114, which engages (e.g. meshes) with the carrier 122a, rotates in the same direction (i.e. clockwise).

Rotation of the control member 114 causes the right carrier 122b to rotate in the direction indicated in FIG. 2b (i.e. anticlockwise) and the plurality of right planetary gears 120b to orbit the right sun 122b in the same direction (i.e. anti-clockwise). This in turn causes each of the plurality of right planetary gears 120b to rotate about an axis of each respective planetary gear 120b in the opposite direction (i.e. clockwise). Because the right sun gear 118b is coupled to each of the plurality of right planetary gears 120b, the right sun gear 118b and the threaded shaft 103b of the right conversion mechanism 104b, which is coupled to the right sun gear 118b, rotate in the direction indicated in FIG. 2b (i.e. anticlockwise).

The right inceptor 108b is also connected to a nut 105a, through which the threaded shaft 103b of the right conversion mechanism 104b extends. As a result, the right inceptor 108b translates along the threaded shaft 103b of the right conversion mechanism 104b in the opposite direction to the actuated left inceptor 108a (i.e. towards the second plate 110b).

As illustrated in FIG. 2b, during the aircraft control movement process, the adjustment member 116 is maintained in position via the adjustment member maintaining device 117, causing each of the ring gears 124a, 124b to be maintained in position (due to the left ring gear 124a engaging (e.g. meshing) with the right ring gear 124b) so that the differential devices 112a, 112b undergo fixed ring motion as described above. This prevents a simultaneous aircraft control process and adjustment process from occurring.

It will be understood that when the right inceptor 108b is translated forwards (i.e. towards the first plate 110a) the threaded shafts 103a, 103b of the conversion mechanisms 104a, 104b and components of the differential devices 112a, 112b rotate in opposite directions to those described above. This causes the left inceptor 108a to translate backwards (i.e. in the opposite direction to the right inceptor 108a towards the second plate 110b) and the control member 114 to rotate in the opposite direction to that described above.

The above relates to a manual operation of the bilateral control mechanism 100. However, the bilateral control mechanism 100 may also be electrically actuated, e.g. by an autopilot system. In such arrangements, the aircraft control process is initiated by actuating (i.e. rotating) the control member 114 directly, rather than one of the inceptors 108a, 108b, for example, with an electro-mechanical actuator such as a motor. The bilateral control mechanism 100 results in translation of the inceptors 108a 108b corresponding to the rotation of the control member 114.

Figure 3A:
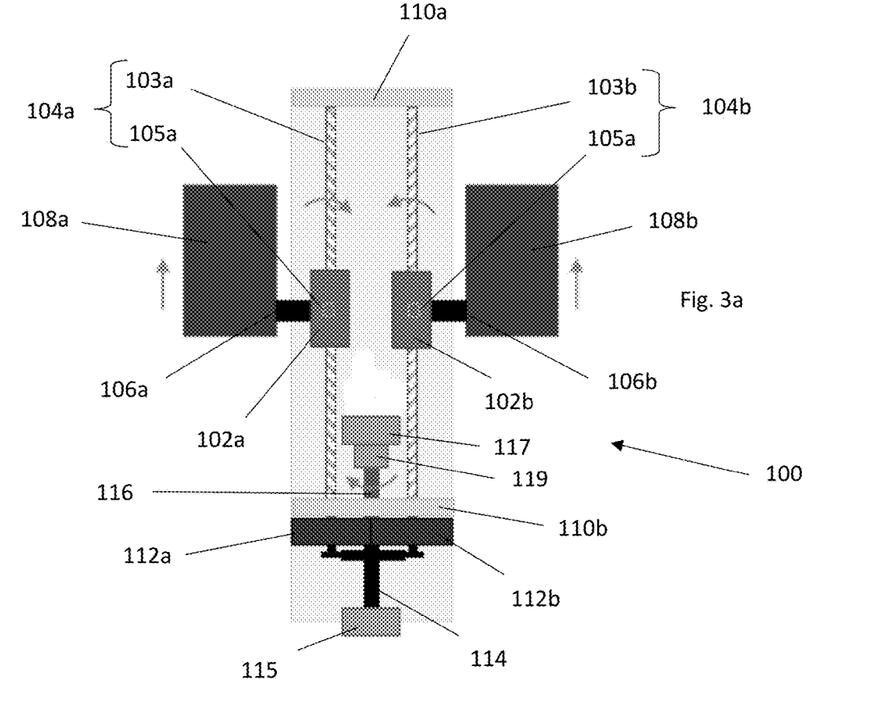
FIG. 3a shows a schematic of a bilateral control mechanism during an adjustment process.
Figure 3B:
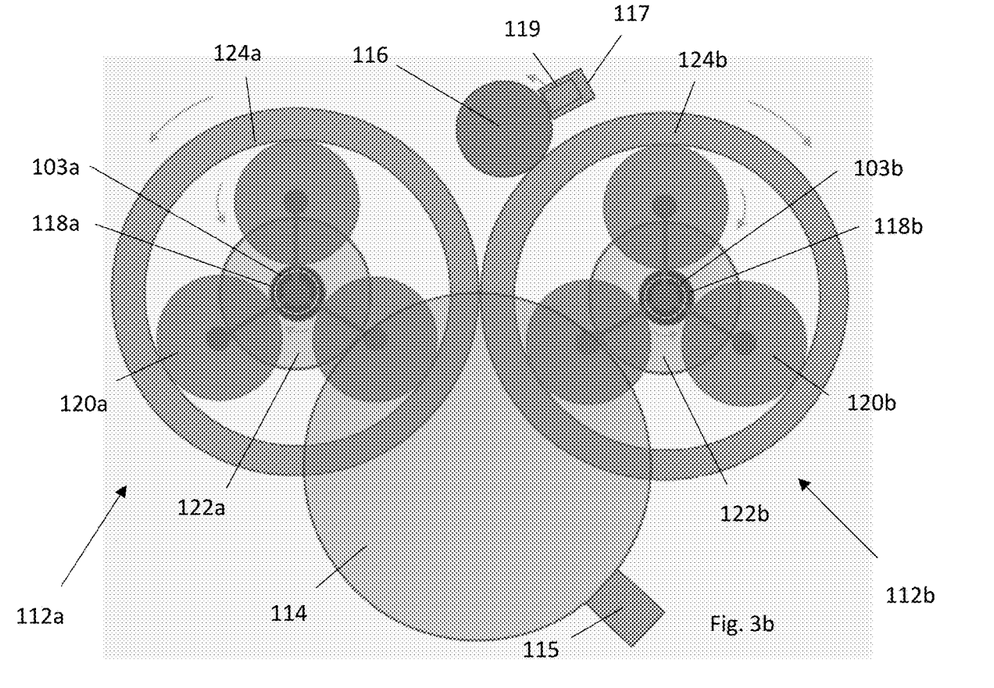
FIG. 3b shows a schematic of a section of a bilateral control mechanism during an adjustment process.

With reference to FIGS. 3a-3b, when the right inceptor 108b of the right control mechanism is actuated during an adjustment process (in which the translational neutral positions of the inceptors are adjusted), e.g. by a pilot, the right inceptor connector 102b translates along the threaded shaft 103b of the right conversion mechanism 104b in the direction indicated (i.e. towards first the plate 110a). Movement of the right inceptor connector 102b causes the threaded shaft 103b of the right conversion mechanism 104b to rotate about an axis of the threaded shaft 103b in an anti-clockwise direction as indicated in FIG. 3a (i.e. anti-clockwise). This in turn causes the right differential device 112b to rotate with the threaded shaft 103b of the right conversion mechanism 104b. Specifically, the sun gear 118b rotates about an axis of the right differential device 112b in the same rotational direction as the threaded shaft 103b of the right conversion mechanism 104b (i.e. anti-clockwise). Because the right sun gear 118b engages (e.g. meshes) with the plurality of right planetary gears 120b, each of the plurality of right planetary gears 120b also rotates, but in the opposite direction (i.e. clockwise) about an axis of each respective right planetary gear 120b.

In contrast to the aircraft control process, during an adjustment process, the ring gears 124a, 124b are not maintained in position. However, the control member 114 is maintained in position via the control member maintaining device 115, resulting in the carriers 118a 118b being maintained in position. The planetary gears 120a 120b are therefore unable to orbit their respective sun gears 118a 118b. Rotation of each of the plurality of right planetary gears 120b about its axis causes the right ring gear 124b to rotate about an axis of the right differential device 112b in the same direction as the plurality of right planetary gears 120b (i.e. clockwise). Because the right ring gear 124b is coupled to the adjustment member 116, the adjustment member 116 also rotates, but in the opposite direction (i.e. anti-clockwise).

Rotation of the right ring gear 124b causes the left ring gear 124a and the plurality of left planetary gears 120a coupled to the left ring gear 124a to rotate in the direction indicated in FIG. 3b (i.e. anticlockwise). This in turn causes the left sun gear 118a, which engages (e.g. meshes) with the plurality of left planetary gears 120a, and the threaded shaft 103a of the left conversion mechanism 104a, which engages (e.g. meshes) with the left sun gear 118a, to rotate in the opposite direction (i.e. clockwise). As a result, the left inceptor 108a translates along the threaded shaft 103a of the left conversion mechanism 104a in the same direction to the actuated right inceptor 108b (i.e. towards the first plate 110a).

It will be understood that the adjustment process can also be performed by translating the left inceptor 108a, which results in corresponding translation of the right inceptor 108b.

Because the control member 114 is maintained in position during the adjustment process, the translational neutral position of the inceptors 108a, 108b can be adjusted.

In other arrangements, rather than a pilot actuating the inceptor(s) 104a, 104b, the adjustment member 116 can be actuated (i.e. rotated), e.g. manually by a pilot or by an electro-mechanical actuator such as a motor (not shown). As will be understood, rotation of the adjustment member 116 causes translation of the inceptors 108a, 108b via the differential devices 112a, 112b as described above. Specifically, actuation of the adjustment member 116 causes the adjustment member 116 to rotate, for example, in an anti-clockwise direction as indicated in FIG. 3b. This in turn causes the right ring gear 124b, and the plurality of right planetary gears 120b engaging (e.g. meshing) with the right ring gear 124b to rotate in the opposite direction (i.e. clockwise). Because the right sun gear 118b engages (e.g. meshes) with the plurality of right planetary gears 120b, the right sun gear 118b and the threaded shaft 103b of the right conversion mechanism 104b, which engages (e.g. meshes) with the right sun gear 118b, rotate in the direction indicated in FIG. 3b (i.e. anti-clockwise). As a result, the right inceptor 108b translates along the threaded shaft 103b of the right conversion mechanism 104b towards the first plate 110a.

During this process, rotation of the right ring gear 124b causes rotation of the left ring gear 124b, actuating the left differential device 112a as described above. This results in corresponding movement of the left inceptor 108a, and a repeated description of this is omitted.

As illustrated in FIG. 3b, during the adjustment process, the control member 114 is maintained in position via the control member maintaining device 115, causing each of the carriers 122a, 122b to be maintained in position so that the differential devices 112a, 112b undergo fixed carrier motion, as described above. This prevents a simultaneous aircraft control process and adjustment process from occurring.

The adjustment process is performed when the aircraft is stationary. The adjustment process permits the pilot to adjust the translational neutral position of the inceptor connectors 102a, 102b, permitting pilots of different stature to be accommodated in the aircraft.

Additionally, the bilateral control mechanism 100 may comprise a stop (not shown) to prevent movement of the control member 114 when the inceptor connector 102a, 102b reaches a maximum translation distance during the aircraft control process.

Figure 4A:
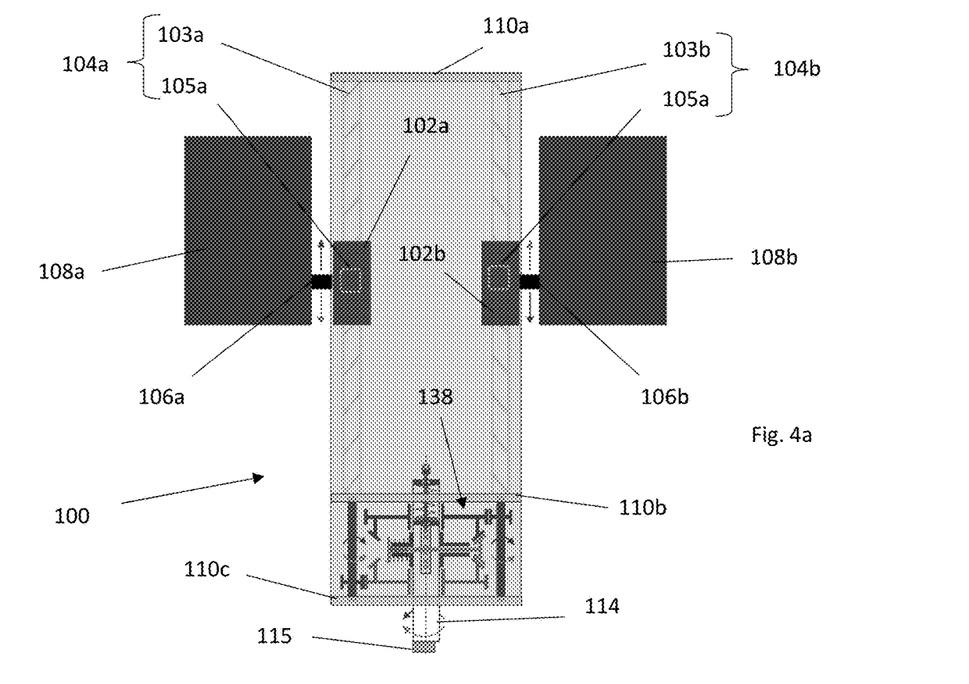
FIG. 4a shows a schematic of a bilateral control mechanism during an aircraft control process.
Figure 4B:
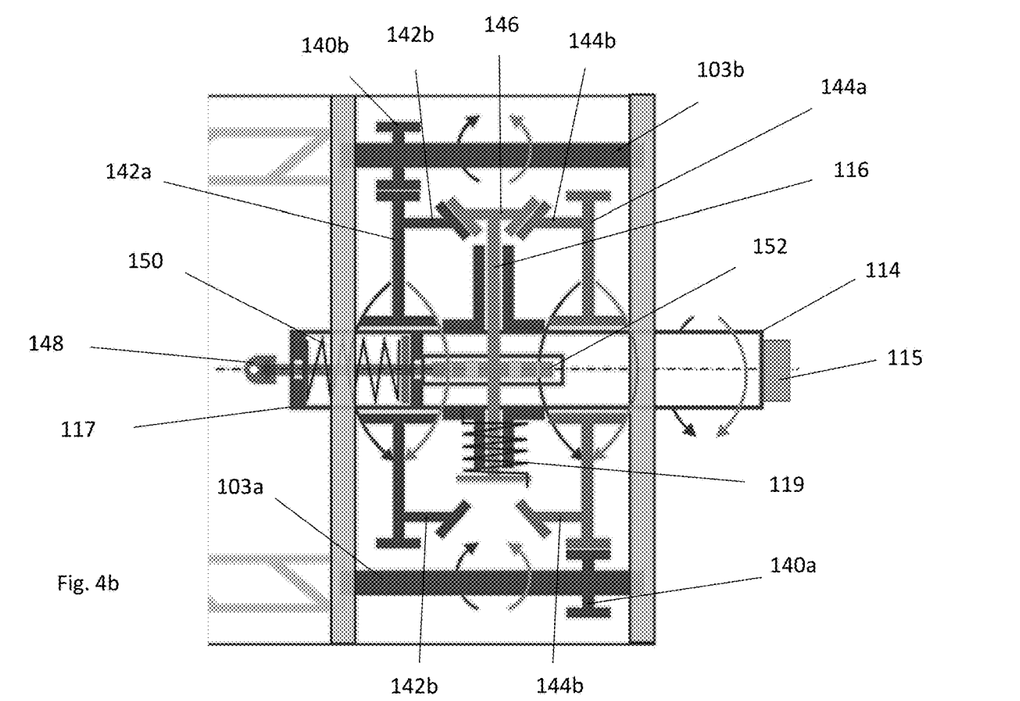
FIG. 4b shows a schematic of a section of a bilateral control mechanism during an aircraft control process.
Figure 5A:
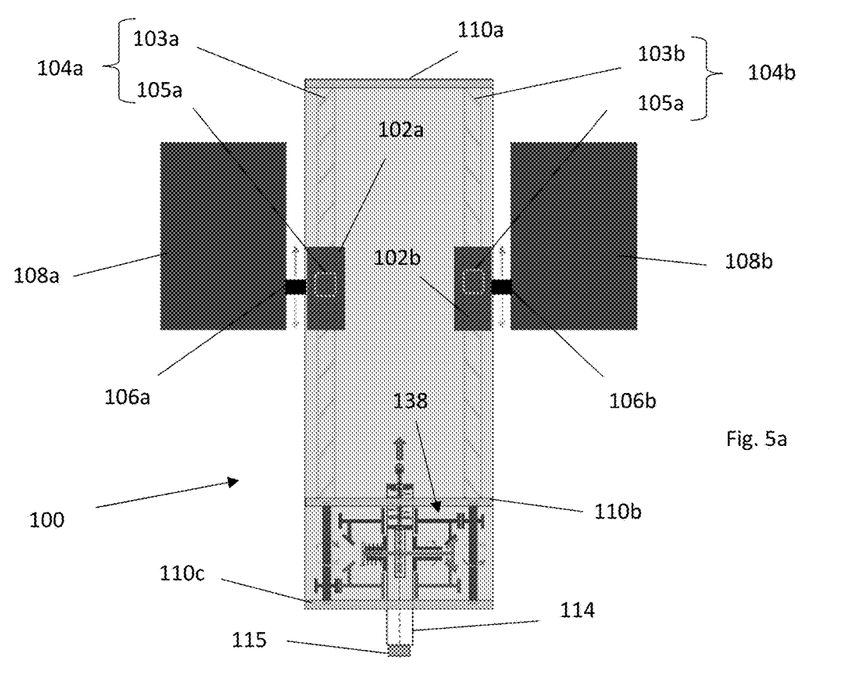
FIG. 5a shows a schematic of a bilateral control mechanism during an adjustment process.
Figure 5B:
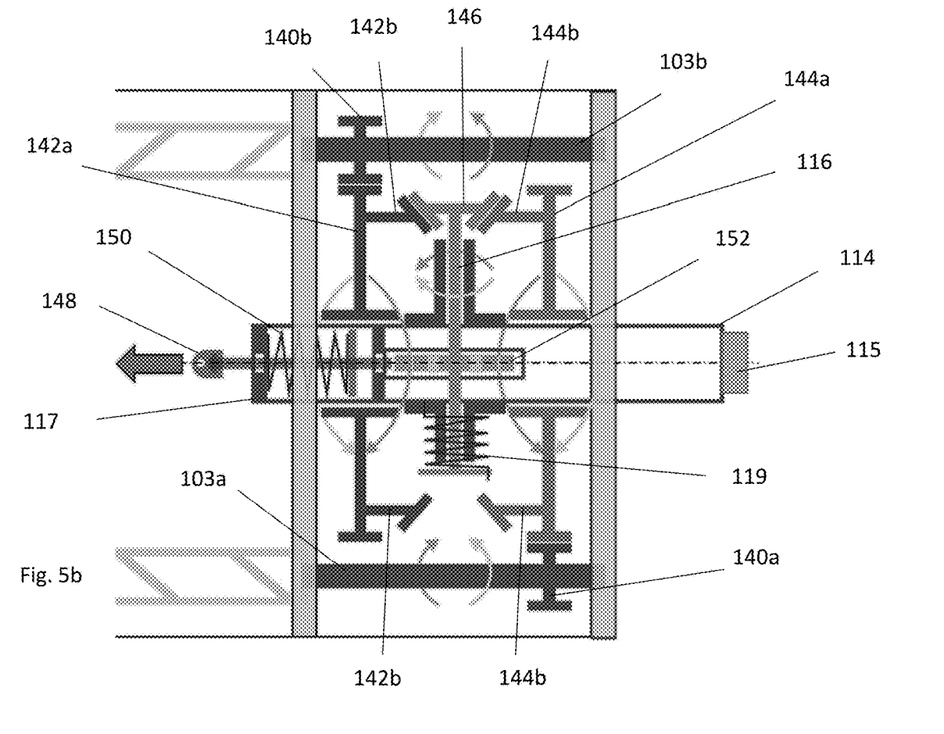
FIG. 5b shows a schematic of a section of a bilateral control mechanism during an adjustment process.

With reference to FIGS. 4-5, in an alternative arrangement, the left differential device 112a and the right differential device 112b are replaced by a single differential device 138. This arrangement is otherwise the same as that described above.

As illustrated, in this arrangement, the left conversion mechanism 104a is rigidly coupled to a left gear 140a and is rotationally coupled to a third plate 110c via the second end of the threaded shaft 103a of the left conversion mechanism 104a. Similarly, the right conversion mechanism 104b is rigidly coupled to a right gear 140b and is rotationally coupled to the third plate 110c via the second end of the threaded shaft 103b of the right conversion mechanism 104b. Like the first and second plates 110a, 110b, the third plate 110c provides structural support to the left and right conversion mechanisms 104a, 104b, and is fixed to a fixed point on the aircraft (e.g. an aircraft floor). Each of the left and right conversion mechanisms 104a, 104b is permitted to rotate relative to the third plate 110c.

The differential device 138 comprises a front planetary gear 142, a back planetary gear 144, and a satellite gear 146. The planetary gears 142, 144 rotate about the axis of the control member 114, which extends through the centre of each of the planetary gears 142, 144. The adjustment member 116 extends through the control member 114 in a direction perpendicular to the direction in which the control member 114 extends and rotates about an axis perpendicular to the axis of rotation of the planetary gears 142, 144. The satellite gear 146 is rigidly coupled to the adjustment member 116 and rotates with the adjustment member 116.

The front planetary gear 142 is a compound gear comprising a first gear 142a and a second gear 142b rigidly coupled to each other, and which rotate together about the same axis (i.e. the axis of the control member 114). Similarly, the back planetary gear 144 is a compound gear comprising a first gear 144a and a second gear 144b rigidly coupled to each other, and which rotate together about the same axis (i.e. the axis of the control member 114). The first gear 142a, 144a of each of the planetary gears 142, 144 has a radius that is greater than the radius of the second gear 142b, 144b of each of the planetary gears 142, 144. The radius of the first gears 142a, 144a are the same and the radius of the second gears 142b, 144b are the same.

The outer circumferential edge of the left gear 140a engages (e.g. meshes) with the outer circumferential edge of the first gear 144a of the back planetary gear 144. In a similar manner, the outer circumferential edge of the right gear 140b engages (e.g. meshes) with the outer circumferential edge of the first gear 142a of the front planetary gear 142. The two planetary gears 142, 144 are also coupled to each other via the satellite gear 146, which rotates about an axis perpendicular to the axis around which the planetary gears 142, 144 rotate. Specifically, the outer circumferential edge of the satellite gear 146 engages (e.g. meshes) with the outer circumferential edges of the second gears 142b, 144b of each of the planetary gears 142, 144. This arrangement allows the left and right conversion mechanisms 104a, 104b to be synchronised (e.g. configured such that movement of one of the conversion mechanism 104a, 104b causes movement of the other conversion mechanism 104a, 104b, as described below).

In this arrangement, the adjustment member maintaining device 117 is a reversible locking mechanism comprising a locking shaft 148 coupled to a mechanical spring 150, and a disc 152 having a plurality of notches. The disc 152 is rigidly coupled to the adjustment member 116 and rotates with the adjustment member 116, i.e. around an axis perpendicular to the axis of rotation of the planetary gears 142, 144. Each of the plurality of notches is configured to engage with the locking shaft 148 to provide discrete positions in order to lock the inceptor connectors 102a, 102b at different translational neutral positions along the threaded shafts 103a, 103b of the conversion mechanisms 104a, 104b as required.

As described in detail below, during the aircraft control process, the satellite gear 146 provides a rigid coupling between the planetary gears 142, 144 so that the components of the differential device 138 rotate as a single unit.

With reference to FIGS. 4a-4b, when the left inceptor 108a is actuated during an aircraft control process, the threaded shaft 103a of the left conversion mechanism 104a rotates about an axis of the threaded shaft 103a in an anti-clockwise direction. This in turn causes the left gear 140a to rotate with the threaded shaft 103a of the left conversion mechanism 104a. Specifically, the left gear 140a rotates about an axis of the left conversion mechanism 104a in the same rotational direction as the threaded shaft 103a of the left conversion mechanism 104a (i.e. anti-clockwise). Because the left gear 140a engages (e.g. meshes) with the first gear 144a of the back planetary gear 144, the back planetary gear 144, and therefore the second gear 144b of the back planetary gear 144, also rotate, but in the opposite direction (i.e. clockwise) about an axis of the back planetary gear 144.

During the aircraft control process, the adjustment member 116 is prevented from rotating about its own axis via the adjustment member maintaining device 117. This means that the satellite gear 146 cannot rotate and becomes rigidly coupled to the planetary gears 142, 144. As such, rotation of the second gear 144b of the back planetary gear 144 causes the satellite gear 146 to revolve around the axis of the control member 114 in the same direction that the back planetary gear 144 rotates (i.e. clockwise). Because the satellite gear 146 is coupled to the adjustment member 116 and the adjustment member 116 passes through the control member 114, the control member 114 rotates clockwise about its own axis.

Moreover, since the satellite gear 146 is rigidly coupled to the planetary gears 142, 144, movement of the satellite gear 146 around the axis of the control member 114 causes the second gear 142b of the front planetary gear 142 to rotate in the clockwise direction, and therefore the front planetary gear 142 and the first gear 142a of the front planetary gear 142 to rotate in the same direction (i.e. clockwise). This in turn causes the right gear 140b to rotate about an axis of the right conversion mechanism 104b in the opposite direction (i.e. anti-clockwise). Because the right gear 140b is coupled to the right conversion mechanism 104b, the right conversion mechanism 104b rotates in the anti-clockwise direction. As a result, the right inceptor 108b translates along the threaded shaft 103b of the right conversion mechanism 104b in the opposite direction to the actuated left inceptor 108a (i.e. towards the second plate 110b).

During the aircraft control movement process, the adjustment member maintaining device 117 prevents the adjustment member 116 from rotating about its own axis. Specifically, the mechanical spring 150 biases the locking shaft 148 to engage with one of the plurality of notches on the disc 152 in order to prevent rotation of the adjustment member 116 about its own axis. This prevents a simultaneous aircraft control process and adjustment process from occurring.

It will be understood that when the right inceptor 108b is translated forwards (i.e. towards the first plate 110a) the threaded shafts 103a, 103b of the conversion mechanisms 104a, 104b and components of the differential device 138 rotate in opposite directions to those described above. This causes the left inceptor 108a to translate backwards (i.e. in the opposite direction to the right inceptor 108a towards the second plate 110b) and the control member 114 to rotate in the opposite direction to that described above.

The above relates to a manual operation of the bilateral control mechanism 100. However, the bilateral control mechanism 100 may also be electrically actuated, e.g. by an autopilot system. In such arrangements, the aircraft control process is initiated by actuating (i.e. rotating) the control member 114 directly, rather than one of the inceptors 108a, 108b, for example, with an electro-mechanical actuator such as a motor. The bilateral control mechanism 100 results in translation of the inceptors 108a 108b corresponding to the rotation of the control member 114.

As described in detail below, during the adjustment process, the satellite gear 146 is rotationally coupled to the planetary gears 142, 144 so that the components of the differential device 138 rotate separately.

With reference to FIGS. 5a-5b, when the right inceptor 108b of the right control mechanism is actuated during an adjustment process the threaded shaft 103b of the right conversion mechanism 104b rotates about an axis of the threaded shaft 103b in a clockwise direction. This in turn causes the right gear 140b to rotate with the threaded shaft 103b of the right conversion mechanism 104b. Specifically, the right gear 140b rotates about an axis of the right conversion mechanism 104b in the same rotational direction as the threaded shaft 103b of the right conversion mechanism 104b (i.e. clockwise). Because the right gear 140b engages (e.g. meshes) with the first gear 142a of the front planetary gear 142, the front planetary gear 142, and therefore the second gear 142b of the front planetary gear 142, also rotate, but in the opposite direction (i.e. anti-clockwise) about an axis of the front planetary gear 142.

In contrast to the aircraft control process, during an adjustment process, the adjustment member 116 can rotate about its own axis. However, the control member 114 is maintained in position via the control member maintaining device 115. This means that the satellite gear 146 can rotate about the axis perpendicular to the axis of rotation of the planetary gears 142, 144, but cannot revolve around the axis of the control member 114. As such, rotation of the second gear 142b of the front planetary gear 142 causes the satellite gear 146 to rotate about its own axis in a backward direction (i.e. from the perspective of the pilot looking towards the first plate 110a). Because the satellite gear 146 is coupled to the adjustment member 116, the adjustment member 116 rotates with the satellite gear 146.

Rotation of the satellite gear 146 about its own axis causes the second gear 144b of the back planetary gear 144 to rotate in the clockwise direction, and therefore the back planetary gear 144 and the first gear 144a of the back planetary gear 144 to rotate in the same direction (i.e. clockwise). This in turn causes the left gear 140a, which engages (e.g. meshes) with the first gear 144a of the back planetary gear 144, and the threaded shaft 103a of the left conversion mechanism 104a to rotate in the opposite direction (i.e. anti-clockwise). As a result, the left inceptor 108a translates along the threaded shaft 103a of the left conversion mechanism 104a in the same direction to the actuated right inceptor 108b (i.e. towards the first plate 110a).

During the adjustment process, the adjustment member maintaining device 117 is disengaged from the adjustment member 116 so that the components of the differential device 138 can rotate separately. Specifically, the locking shaft 148 is pulled toward the first plate 110a, compressing the mechanical spring 150 and disengaging the locking shaft 148 from the disc 152 so that the adjustment member 116 can rotate about its own axis. If the right inceptor 104b is not actuated by the pilot, the mechanical spring 119 biases the adjustment member 116 to rotate in a forward direction, causing the position of the right inceptor 104b to move back towards the pilot. If the right inceptor 104b is actuated, the mechanical spring 119 becomes twisted. When the adjustment process is complete, the mechanical spring 150 biases the locking shaft 148 to re-engage with one of the plurality of notches, which may be a different notch in accordance with the adjustment.

It will be understood that the adjustment process can also be performed by translating the left inceptor 108a, which results in corresponding translation of the right inceptor 108b.

In other arrangements, rather than a pilot actuating the inceptor(s) 104a, 104b, the adjustment member 116 can be actuated (i.e. rotated), e.g. manually by a pilot or by an electro-mechanical actuator such as a motor (not shown). As will be understood, rotation of the adjustment member 116 causes translation of the inceptors 108a, 108b via the differential device 138 as described above. Specifically, actuation of the adjustment member 116 causes the adjustment member 116 to rotate, for example, in a forward direction as indicated in FIG. 5b. This in turn causes the satellite gear 146 to rotate in a forward direction, the front planetary gear 142 to rotate in a clockwise direction and the back planetary gear 144 to rotate in the opposite direction (i.e. anti-clockwise). Because the right gear 140b engages (e.g. meshes) with the first gear 142a of the front planetary gear 142, the right gear 140b and the threaded shaft 103b of the right conversion mechanism 104b, which engages (e.g. meshes) with the right gear 140b, rotate in the anti-clockwise direction. As a result, the right inceptor 108b translates along the threaded shaft 103b of the right conversion mechanism 104b away the first plate 110a.

During this process, rotation of the back planetary gear 144 causes rotation of the left gear 140a. This results in corresponding movement of the left inceptor 108a, and a repeated description of this is omitted.

As illustrated in FIG. 5a-5b, during the adjustment process, the control member 114 is maintained in position via the control member maintaining device 115, preventing the satellite gear 146 from rotating about an axis of the control member 114, as described above. This prevents a simultaneous aircraft control process and adjustment process from occurring.

The threaded shafts 103a, 103b of the conversion mechanisms 104a, 104b are threaded in opposite directions. Alternatively, the threaded shafts 103a, 103b of the conversion mechanisms 104a, 104b may be threaded in the same direction. However, in such arrangements, the positions of the control member 114 and adjustment member 116 are reversed.

With reference to FIGS. 6-9, the bilateral control mechanism 100 further comprises a guiding mechanism. The guiding mechanism prevents the inceptor connectors 102a, 102b from rotating around the threaded shafts 103a, 103b of the conversion mechanisms 104a, 104b when the inceptor connectors 102a, 102b translate along the conversion mechanisms 104a, 104b during an aircraft control process and/or adjustment process.

Figure 6:
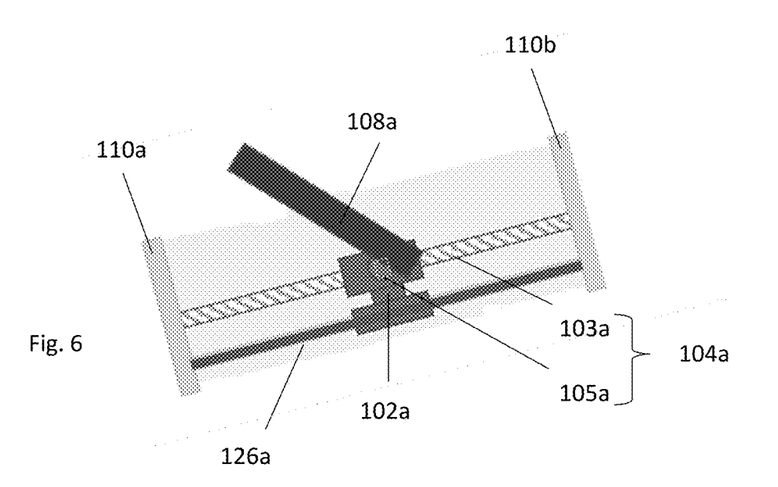
FIG. 6 shows a schematic of a guiding mechanism.

As illustrated in FIG. 6, the guiding mechanism comprises a rail 126a (in this example, a left rail 126a) having a first end and a second, opposite end. The first end is coupled to the first plate 110a, and the second end is coupled to the second plate 110b. The rail 126a extends parallel to the threaded shaft 103a of the left conversion mechanism 104a. The left inceptor connector 102a is slidably coupled to the left rail 126a, such that the left inceptor connector 102a can slide along the left rail 126a when the left inceptor connector 102a translates along the threaded shaft 103a of the left conversion mechanism 104a. This prevents rotation of the left inceptor 108a about the threaded shaft 103a of the left conversion mechanism 104a, maintaining the left inceptor 108a in an ergonomic position for the pilot. In this arrangement, the left rail 126a is positioned below the threaded shaft 103a of the left conversion mechanism 104a. However, in other arrangements, the left rail 126a may be positioned above the inceptor connector 102a or in between the threaded shafts 103a, 103b of the conversion mechanisms 104a, 104b. The guiding mechanism further comprises a right rail (not shown), which operates in the same manner for the right inceptor 108b. Repeated description in relation to the right rail is omitted. The left rail 126a and the right rail are not coupled to each other.

Figure 7A:
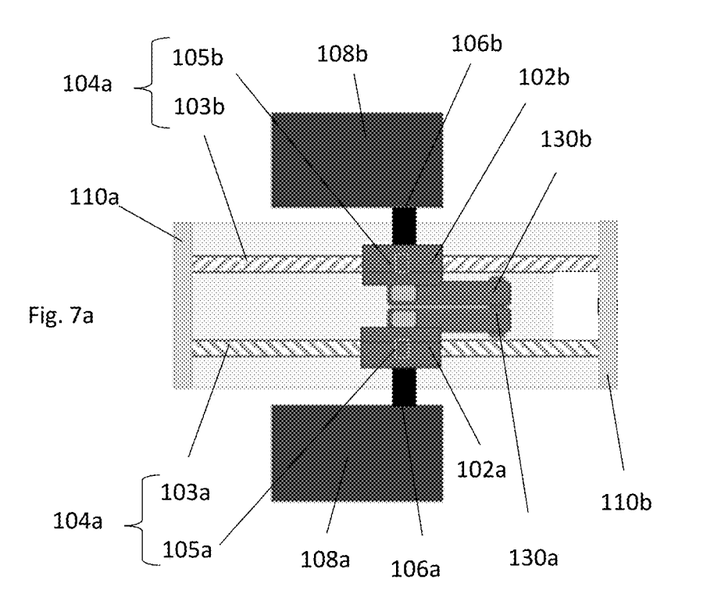
FIGS. 7a-7c show a schematic of a guiding mechanism.
Figure 7B:
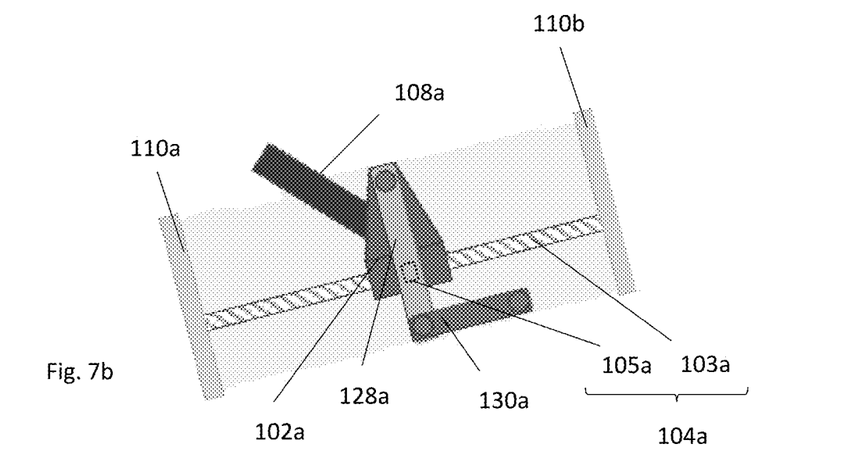
Figure 7C:
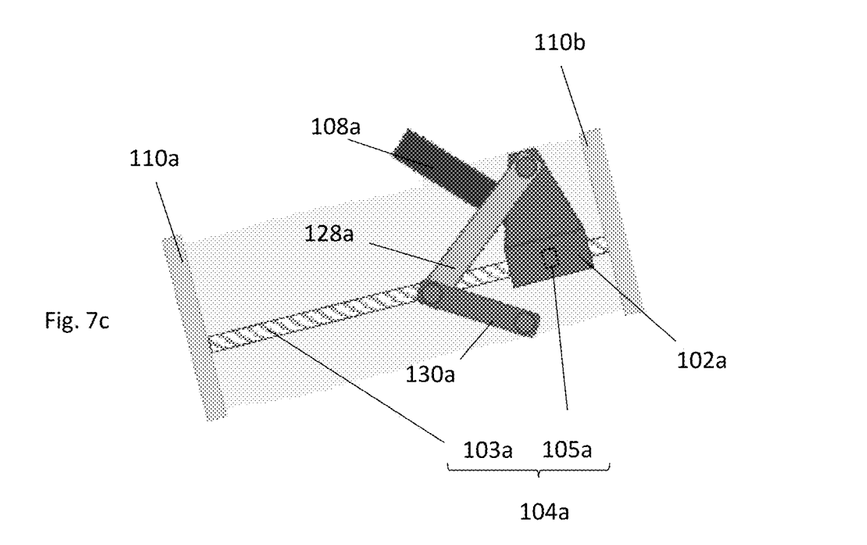

As illustrated in FIGS. 7a-7c, in other arrangements, the guiding mechanism comprises a frame for each inceptor 108a, 108b. The frame of the left inceptor 108a and the frame of the right inceptor 108b are not coupled to each other. The frame comprises a first arm 128a, 128b and a second arm 130a, 130b, each having a first end and a second, opposite end. The first end of the first arm 128a, 128a is pivotally coupled to the inceptor connector 102a, 102b, and the second end of the first arm 128a, 128b is pivotally coupled to the first end of the second arm 130a, 130b. The second end of the second arm 130a, 130b is pivotally coupled to a fixed point (e.g. an aircraft floor). This arrangement forms a planar linkage mechanism. The arms 128a, 128b, 130a, 130b rotate during translation of the inceptors 108a, 108b. The arms 128a, 128b, 130a, 130b are constrained to move in a plane, preventing rotation of the inceptors 108a, 108b about the threaded shafts 103a, 103b of the conversion mechanisms 104a, 104b.

Figure 8:
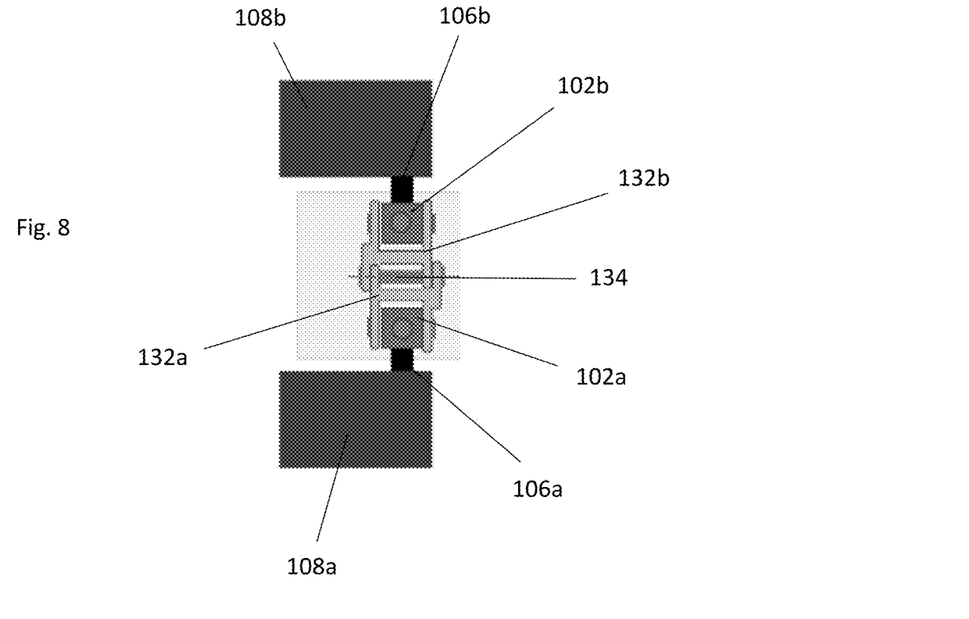
FIG. 8 shows a schematic of a guiding mechanism.

FIG. 8 illustrates a further guiding mechanism comprising a left clasp 132a and a right clasp 132b. Each clasp 132a, 132b is rotationally coupled to a respective inceptor connector 102a, 102b. In contrast to the arrangements described above, the left clasp 132a is rotatably coupled to the right clasp 132b via a rod 134. Again, the clasp 132a, 132b provide a planar linkage mechanism. This arrangement prevents rotation of the inceptors 108a, 108b about the threaded shafts 103a, 103b of the conversion mechanisms 104a, 104b by coupling the left inceptor 108a to the right inceptor 108b, with the clasps 132a, 132b constrained to move in a plane, in particular a horizontal plane.

Figure 9A:
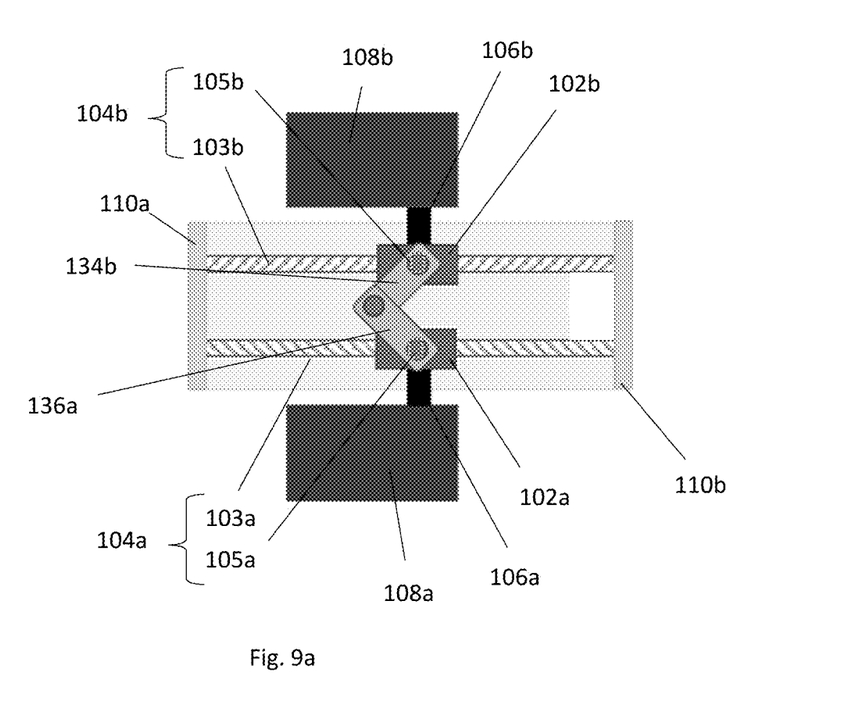
FIGS. 9a-9c show a schematic of a guiding mechanism.
Figure 9B:
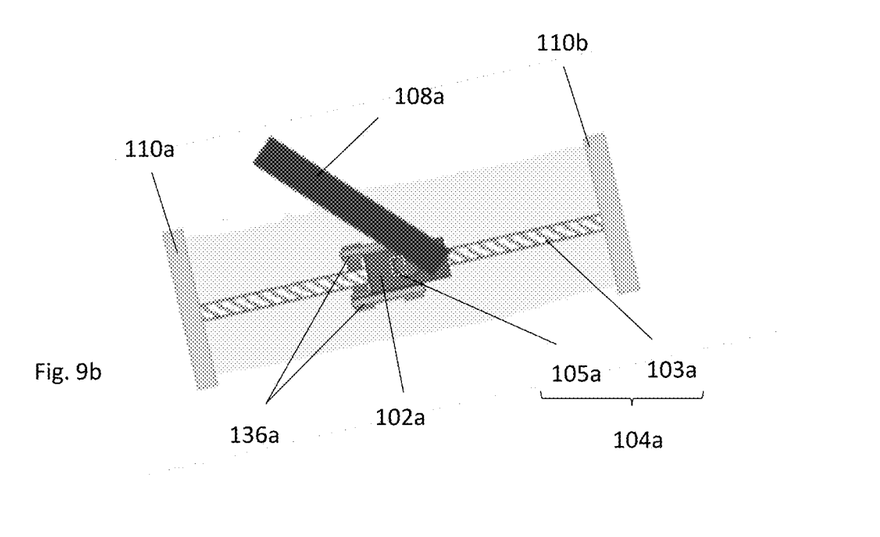
Figure 9C:
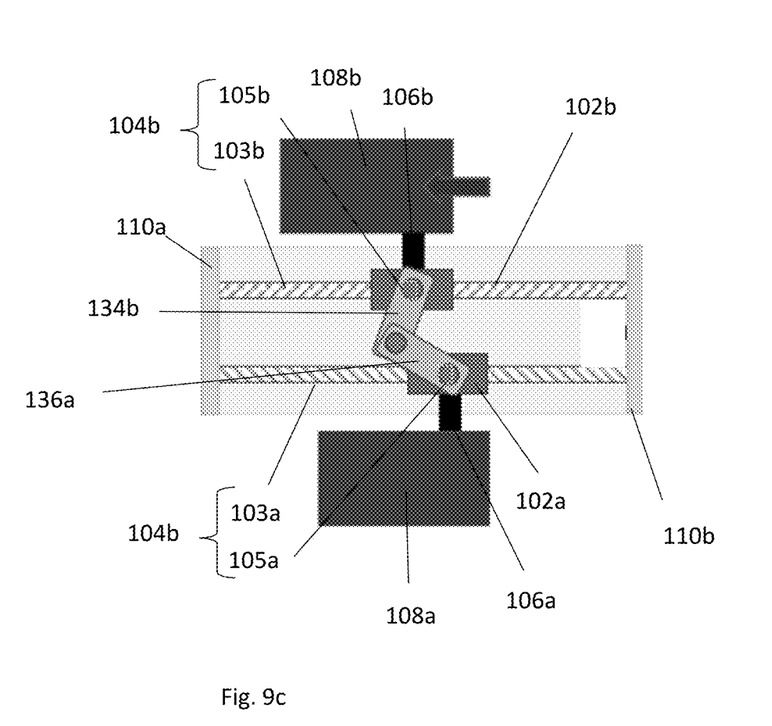

With reference to FIGS. 9a-9c, in alternative arrangements, the guiding mechanism comprises a hinge having a left arm 134a and a right arm 134b. The left arm 134a comprises a first end and a second, opposite end. The first end of the left arm 134a is pivotally coupled to the left inceptor connector 102a and the second end of the left arm 134a is pivotally coupled to a first end of the right arm 134b. As with the arrangement described in FIG. 8, this arrangement prevents rotation of the inceptors 108a, 108b about the threaded shafts 103a, 103b of the conversion mechanisms 104a, 104b by coupling the left inceptor 108a to the right inceptor 108b using a planar linkage mechanism.

The bilateral control mechanism 100 is preferably a rudder control mechanism.

In some embodiments, there is provided an aircraft comprising the bilateral control mechanism 100. The aircraft may comprise a controller (not shown). The controller may be configured to determine the translational neutral position of the inceptor connectors 102a, 102b. For example, the controller may detect the rotational position of the adjustment member 116 and then determine the translational neutral position of the inceptor connectors 102a, 102b based on the rotational position of the adjustment member 116. In this case, the controller may directly detect the rotational position of the adjustment member 116 via a sensor, e.g. a RVDT sensor, a hall effect sensor, an optical sensor or other equivalent. Alternatively, the controller may indirectly detect the rotational position of the adjustment member 116 based on data related to the bilateral control mechanism 100.

Likewise, the controller may be configured to determine the rotational position of the control member 114 from a translational neutral position. In this case, the controller may directly detect the rotational position of the control member 114 via a sensor, e.g. a RVDT sensor, a hall effect sensor, an optical sensor or other equivalent. Alternatively, the controller may indirectly detect the rotational position of the control member 114 based on data related to the bilateral control mechanism 100.

For example, the control member 114 may comprise a rotation sensor (not shown). The rotation sensor may detect rotation of the control member 114 and output a signal (e.g. an image of the current rotational position of the control member 114).

In these embodiments, the controller outputs an aircraft control signal based on the translational neutral position of the inceptor connectors 102a, 102b and the rotational position of the control member 114. When the control member 114 (and the inceptor connectors 102a, 102b) are at the translation neutral position, the aircraft control signal is zero.

Although not illustrated, there may be provided a unilateral control mechanism. In this arrangement, the inceptor 108a, 108b may comprise a side stick unit or a gas throttle assembly, i.e. the control mechanism may be hand-operated.

Various aspects of the control mechanism disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from the invention in its broader aspects. The scope of the following claims should not be limited by the embodiments set forth in the examples, but should be given the broadest reasonable interpretation consistent with the description as a whole.

The invention claimed is:

1. A control mechanism for an aircraft, the control mechanism comprising:
    a conversion mechanism having a translatable part and a rotatable part, the translatable part being reversibly translatable;
    an inceptor connector connected to the translatable part of the conversion mechanism;
    a differential device connected to the rotatable part of the conversion mechanism, the conversion mechanism being configured to convert translational motion of the inceptor connector to rotational motion of the differential device;
    an adjustment member connected to the differential device; and
    a control member connected to the differential device;
    wherein the differential device is configured such that the adjustment member is maintainable in position during an aircraft control process to permit:
    translation of the inceptor connector from a translational neutral position; and
    corresponding movement of the control member to control the aircraft through the differential device; and
    wherein the differential device is configured such that the control member is maintainable in position during an adjustment process to permit:
    translation of the inceptor connector; and
    corresponding movement of the adjustment member through the differential device to adjust the translational neutral position.

2. The control mechanism as claimed in claim 1, further comprising:
    an adjustment member maintaining device, wherein the adjustment member maintaining device is configured to, during the aircraft control process, resist movement of the adjustment member; and
    a control member maintaining device, the control member maintaining device being configured to, during the adjustment process, resist movement of the control member.

3. The control mechanism as claimed in claim 2, wherein the adjustment member maintaining device is configured to, during the adjustment process, provide discrete positioning of the inceptor connector on the conversion mechanism to allow variation of the translational neutral position.

4. The control mechanism as claimed in claim 3, wherein the control member maintaining device comprises a control member locking device configured to, during the adjustment process, lock movement of the control member.

5. The control mechanism as claimed in claim 1, wherein the control member is rotatable during an aircraft control process, and the adjustment member is rotatable during an adjustment process.

6. The control mechanism as claimed in claim 1, wherein the differential device comprises an epicyclic gear train.

7. The control mechanism as claimed in claim 6, wherein the epicyclic gear train comprises:
    a sun gear, wherein the rotatable part of the conversion mechanism is coupled to the sun gear such that the rotatable part of the conversion mechanism rotates with the sun gear.

8. The control mechanism as claimed in claim 7, wherein the epicyclic gear train comprises a carrier, wherein the control member is coupled to the carrier such that the carrier rotates with the control member during the aircraft control process.

9. The control mechanism as claimed in claim 6, wherein the epicyclic gear train comprises a ring gear, wherein the adjustment member is coupled to the ring gear such that the ring gear rotates with the adjustment member during the adjustment process.

10. The control mechanism as claimed in claim 1, wherein the conversion mechanism is configured to be inclined relative to a longitudinal axis of an aircraft when installed on the aircraft.

11. The control mechanism as claimed in claim 1, wherein the translatable part of the conversion mechanism is a nut and the rotatable part of the conversion mechanism is a screw, the differential device being actuatable to rotate the screw, upon translation of the inceptor connector.

12. The control mechanism as claimed in claim 1, further comprising a guiding mechanism, the guiding mechanism configured to maintain an orientation of the inceptor connector during translation of the inceptor connector.

13. The control mechanism as claimed in claim 1, further comprising:
    a stop configured to prevent movement of the control member when the inceptor connector reaches a maximum translation distance during the aircraft control process.

14. A bilateral control mechanism comprising:
    a first control mechanism; and
    a second control mechanism;
    wherein the first and second control mechanisms are each as claimed in claim 1.

15. A bilateral control mechanism as claimed in claim 14, wherein the differential device of the first control mechanism and the differential device of the second mechanism are synchronised such that:
    on translation of the inceptor connector of the first control mechanism during the aircraft control process the inceptor connector of the second control mechanism translates in an opposing direction to the inceptor connector of the first control mechanism; and
    on translation of the inceptor connector of the first control mechanism during the adjustment process the inceptor connector of the second control mechanism translates in the same direction as the inceptor connector of the first control mechanism.

16. A bilateral control mechanism as claimed in claim 15, wherein the control member of the first control mechanism and the control member of the second control mechanism are the same control member; and/or
    wherein the adjustment member of the first control mechanism and the adjustment member of the second control mechanism are the same adjustment member; and/or wherein the differential device of the first control mechanism and the differential device of the second control mechanism are the same differential device.

* * * * *